May 2, 1933. W. F. STUMPE 1,906,658
INFLATABLE BALL
Filed Dec. 26, 1929
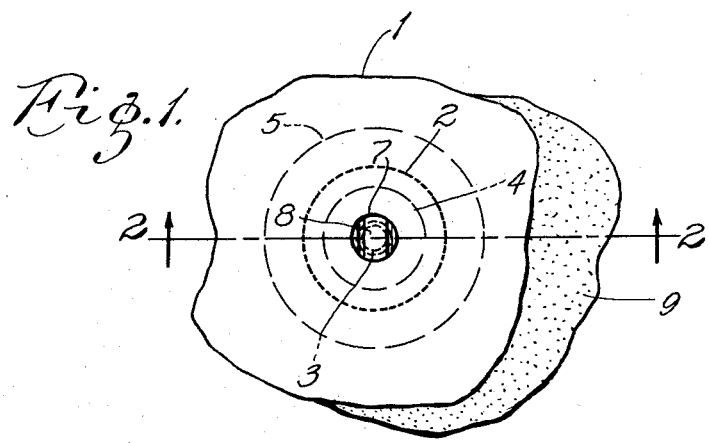
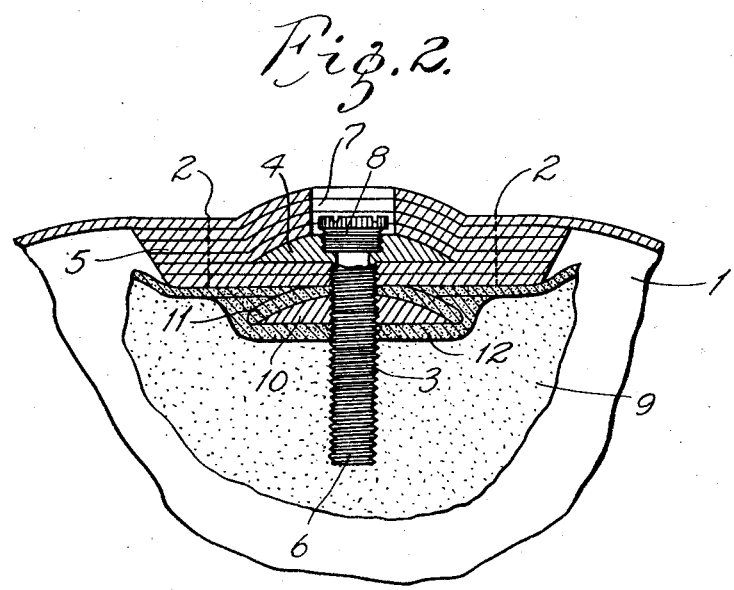
INVENTOR:
Walter F. Stumpe,
by Cantlan+Gravely,
HIS ATTORNEYS.

Patented May 2, 1933

1,906,658

UNITED STATES PATENT OFFICE

WALTER F. STUMPE, OF ST. LOUIS, MISSOURI, ASSIGNOR TO NATIONAL SPORTING GOODS MANUFACTURING COMPANY, OF ST. LOUIS, MISSOURI, A CORPORATION OF MISSOURI

INFLATABLE BALL

Application filed December 26, 1929. Serial No. 416,416.

My invention relates to inflatable balls, such as basketballs and footballs, of the type in which the bladder is inflated by means of a valve secured to the cover some distance away from the opening through which the bladder is inserted in the cover.

The invention has for its principal object a simple and inexpensive construction, in which the bladder is airtight and in which the ball will bounce truly. The invention consists principally in the inflatable ball and in the parts, combinations and arrangements of parts hereinafter described and claimed.

In the accompanying drawing,

Fig. 1 is a plan view of a portion of a gameball embodying my invention; and

Fig. 2 is a sectional view on the line 2—2 of Fig. 1.

Secured to the usual cover 1 of leather or like material, as by threads 2, is a valve member indicated generally as 3. Said valve member has an annular flange 4 at its end which is encircled by the securing threads 2. Preferably said flange is spaced away from the cover 1 by a spacer member 5 consisting of a plurality of strips of leather, rawhide or other suitable light but relatively hard material. Said spacer member also covers the underside of said flange to keep it from contact with the bladder.

The valve member 3 also has an inwardly protruding hollow valve stem 6 in which is mounted the valve (not shown in the drawing). The hollow valve stem 6 opens into a passageway 7 formed by alining holes in the spacer member and in the cover; and the flange portion 4 has an interiorly threaded central hole, preferably of larger diameter than the bore of the valve stem, in which is normally mounted a threaded dust cap 8. The dust cap 8, of course, may be removed for insertion of the outlet pipe of a suitable air pump.

Mounted in a bladder 9 of rubber or the like is an interiorly threaded annulus 10 of metal or other suitable material (as bakelite), said annulus being vulcanized into the bladder and, if advisable, protected by an outer covering 11 of comparatively soft rubber and a vulcanizing patch 12.

The exterior of the valve stem is threaded to receive said annulus 10 of the bladder 9. Cement, white lead or the like may be used, if desired, to prevent any possibility of air escaping. Obviously, the bladder may easily be placed on the valve stem and may be removed therefrom in case the bladder is defective, all without disturbing the valve mechanism.

The construction eliminates parts found necessary in other valve ball constructions, and still the construction is airtight and entirely satisfactory in operation. The spacer member of leather or other rather hard material has been found to greatly increase the distance that the ball will bounce when it strikes over the valve, so that the ball will jump as high and as true when it hits over the valve as when it hits on any other portion.

Obviously, numerous changes may be made without departing from the invention and I do not wish to be limited to the precise construction shown.

What I claim is:

1. An inflatable ball construction comprising a cover, a valve member having an annular flange secured to said cover and having a threaded valve stem extending into the ball, and a bladder having an interiorly threaded annulus secured in its wall for mounting on said threaded valve stem.

2. An inflatable ball construction comprising a cover, a valve member having an annular flange secured to said cover and a threaded valve stem extending into the ball, and a bladder having an interiorly threaded annulus vulcanized in its wall for mounting on said threaded valve stem, said annulus being covered by a protecting member of soft rubber.

3. An inflatable ball construction comprising a cover, a spacer member of rather hard material on the inside of said cover and stitched thereto, a valve member having an annular flange mounted in said spacer member and having a threaded valve stem extending into the ball, and a bladder having an interiorly threaded annulus secured in its wall for mounting on said threaded valve stem.

Signed at St. Louis, Missouri, this 21st day of December, 1929.

WALTER F. STUMPE.